Patented June 1, 1948

2,442,345

UNITED STATES PATENT OFFICE 2,442,345

AZO COMPOUNDS

Joseph B. Dickey, Rochester, N. Y., and James G. McNally, Oak Ridge, Tenn., assignors to Eastman Kodak Company, Rochester, N. Y., a corporation of New Jersey No Drawing. Application June 23, 1945, Serial No. 601,336

10 Claims. (Cl. 260—152)

This invention or discovery relates to new azo compounds and their application to the art of dyeing or coloring. Textile materials such as organic derivatives of cellulose, wool, silk, and nylon and lacquers composed of cellulose esters and cellulose ethers, for example, can be colored. Coloration can be effected by dyeing, printing, stencilling or other suitable methods.

Typical organic derivatives of cellulose include the hydrolyzed as well as the unhydrolyzed cellulose organic acid esters such as cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

It is an object of our invention or discovery to provide a new class of azo compounds. Another object of our invention or discovery is to provide colored textile materials which are of good fastness to light and washing. A further object is to provide a process for the direct coloration of organic derivatives of cellulose, wool, silk and nylon textile materials. A particular object is to provide a new class of nuclear non-sulfonated azo compounds suitable for the coloration of cellulose acetate. A still further object is to provide a satisfactory process for the preparation of the new azo compounds of our invention or discovery.

The azo compounds by means of which the above objects are accomplished or made possible consist of the azo compounds having the formula:

$$R—N=N—R_1$$

wherein R—N=N— stands for the residue of a diazotized member selected from the group consisting of a monocyclic arylamino compound of the benzene series, an arylamino compound of the naphthalene series containing no cyclic nucleus other than a single naphthalene nucleus and an aminoazobenzene and $R_1$ stands for a coupling component selected from the group consisting of a trifluoromethyl-1,2,3,4-tetrahydroquinoline and a trifluoromethylbenzomorpholine and wherein said coupling components are joined to the azo bond through the carbon atom in the 6-position.

Although our invention or discovery relates broadly to the azo compounds having the formula just given, $R_1$ is ordinarily a 1-hydroxyalkyl trifluoromethyl - 1,2,3,4 - tetrahydroquinoline coupling component. Of these compounds having a 1-hydroxyalkyl trifluoromethyl-1,2,3,4-tetrahydroquinoline coupling component those of the formula:

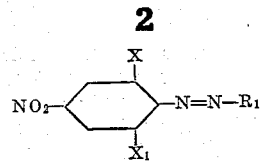

wherein X stands for a member selected from the group consisting of hydrogen, a nitro group and a halogen atom, $X_1$ stands for a member selected from the group consisting of hydrogen, a halogen atom, an alkylketo group, an alkyl group, an alkoxy group, a cyano group, a hydroxy group, an alkylsulfone group and a sulfonamide group and $R_1$ stands for a 1-hydroxyalkyl trifluoromethyl-1,2,3,4-tetrahydroquinoline coupling component joined to the azo bond through the carbon atom in its 6-position appear to be advantageous, especially insofar as the dyeing of cellulose acetate is concerned.

The term "alkyl" as used herein and in the claims refers to unsubstituted alkyl groups such as, for example, the methyl group, the ethyl group, a propyl group or a butyl group. By "hydroxyalkyl" is meant groups, for example, such as β-hydroxyethyl, β-hydroxypropyl, β,γ-dihydroxypropyl and δ-hydroxybutyl. By "alkoxy" is meant groups such as, for example, methoxyl, ethoxyl, propoxyl and butoxyl.

Both sulfonated and non-sulfonated compounds are included within the scope of our invention or discovery. The nuclear non-sulfonated compounds have been found to be especially of value for the dyeing of organic derivatives of cellulose, especially cellulose acetate and it is to these compounds and their application for the dyeing of organic derivatives of cellulose that our invention or discovery is especially directed. These nuclear non-sulfonated compounds likewise possess some application for the dyeing of wool, silk and nylon. For the dyeing of cellulose acetate, the nuclear non-sulfonated azo compounds wherein R is the residue of a monocyclic benzene nucleus are generally advantageous.

The nuclear sulfonated compounds of our invention or discovery have little or no utility for the dyeing of organic derivatives of cellulose but possess application for the dyeing of wool, silk and nylon. Preferably, when the dye compounds are to be employed for the coloration of organic derivatives of cellulose, they should contain no nuclear free carboxylic acid group. Blue, rubine, violet and red shades, for example, can be obtained using the dye compounds of the invention.

The azo compounds described herein can be prepared by diazotizing an arylamino compound of the benzene series, an arylamino compound of the naphthalene series, or an aminoazobenzene and coupling the diazonium compounds obtained with a trifluoromethyl-1,2,3,4-tetrahydroquinoline or a trifluoromethylbenzomorpholine coupling component. The diazotization and coupling reactions involved in the preparation of the azo compounds of our invention or discovery involve no techniques not well known to those skilled in the art.

The following examples will serve to illustrate our new azo compounds and their preparation.

*Example 1*

29 grams of 1-amino-2,4-dinitrobenzene-6-sulfonethylamide are diazotized at a temperature of 0–5° C. with nitrosyl sulfuric acid in the usual manner. The diazonium solution resulting is poured into water and the insoluble diazo compound which precipitates out is recovered by filtration and then dissolved in acetic acid. 28.9 grams of 1-$\beta$,$\gamma$-dihydroxypropyl-2-methyl-7-trifluoromethyl-1,2,3,4-tetrahydroquinoline are dissolved in glacial acetic acid. The diazo solution prepared as described above is then added with stirring while maintaining a temperature of 10–20° C. The coupling reaction which takes place is completed by adding sodium acetate until the reaction mixture is no longer acid to Congo red paper. Upon completion of the coupling reaction, the mixture is poured into water and the precipitated dye compound is recovered by filtration, washed with water and dried. The dye compound obtained has the formula:

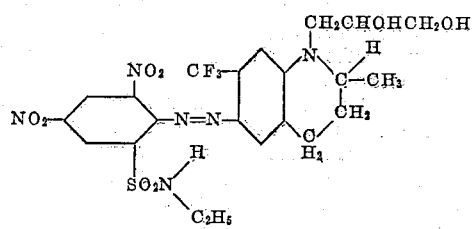

and colors cellulose acetate, wool, silk and nylon blue shades.

By the substitution of an equivalent gram molecular weight of 1-amino-2,4-dinitro-benzene-6-sulfonallylamide for the 1-amino-2,4-dinitrobenzene-6-sulfonethylamide of the example a dye compound is obtained which similarly colors cellulose acetate, wool, silk and nylon blue shades.

*Example 2*

29 grams of 1-amino-2,4-dinitrobenzene-6-sulfonethylamide are diazotized as described in Example 3 and the diazonium compound obtained is coupled in accordance with the procedure described in Example 1 with 29.1 grams of 1-$\beta$,$\gamma$-dihydroxypropyl-2-methyl-7-trifluoromethylbenzomorpholine. The dye compound obtained has the formula:

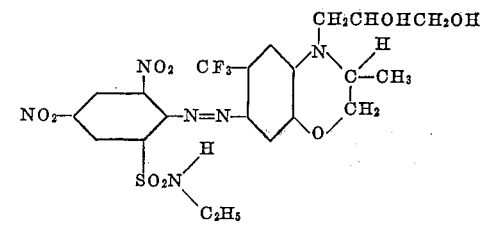

and colors cellulose acetate, wool, silk and nylon blue shades.

*Example 3*

21.8 grams of diazotized 1-amino-2,4-dinitro-6-chlorobenzene are coupled with 27.5 grams of 1-$\beta$,$\gamma$-dihydroxypropyl-2-trifluoromethyl-1,2,3,4-tetrahydroquinoline. Coupling and recovery of the dye compound formed can be carried out in accordance with the procedure described in Example 1. The dye compound obtained has the formula:

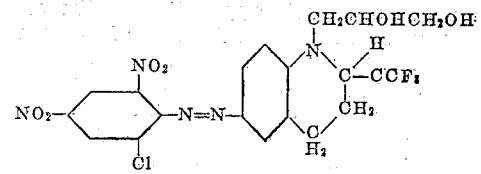

and colors cellulose acetate, wool, silk and nylon violet shades.

*Example 4*

21.4 grams of 4-amino-5-nitrobenzene-sulfonic acid are diazotized and the diazonium compound obtained is coupled with 24.5 grams of 1-$\beta$-hydroxyethyl-2-trifluoromethyl-1,2,3,4-tetrahydroquinoline. The dye compound obtained colors wool and silk red shades.

*Example 5*

19.7 grams of p-aminoazobenzene are diazotized and the diazonium compound obtained is coupled with 24.5 grams of 1-$\beta$,$\gamma$-dihydroxypropyl-2-trifluoromethyl-1,2,3,4-tetrahydroquinoline. Coupling and recovery of the dye compound formed can be carried out in accordance with the procedure described in Example 1. The dye compound obtained colors cellulose acetate, wool, silk and nylon textile materials orange shades.

The following tabulation further illustrates the compounds included within the scope of our invention or discovery. The compounds indicated below may be prepared by diazotizing the amines listed under the heading "amine" and coupling the diazonium compounds obtained with the compounds specified in the column entitled "coupling component." The diazotization and coupling reactions can be carried out following the procedure indicated hereinbefore. The color given is that yielded by the dye on the materials which it is adapted to color. These materials have been previously indicated.

| Amine | Coupling Component | Color |
|---|---|---|
| p-nitroaniline | 1-$\beta$,$\gamma$-dihydroxypropyl-2-trifluoromethyl-1,2,3,4-tetrahydroquinoline | Red. |
| Do | 1-$\beta$,$\gamma$-dihydroxypropyl-2-trifluoromethylbenzomorpholine | Do. |
| 1-amino-2-methyl-4-nitrobenzene | 1-$\beta$,$\gamma$-dihydroxypropyl-2-trifluoromethyl-1,2,3,4-tetrahydroquinoline | Do. |
| 1-amino-2-methoxy-4-nitrobenzene | ......do...... | Do. |
| 1-amino-2-bromo-4-nitrobenzene | ......do...... | Rubine. |
| 1-amino-4-nitro-6-acetobenzene | ......do...... | Do. |
| 1-amino-4-nitrobenzene-6-methylsulfone | ......do...... | Do. |
| 1-amino-4-nitrobenzene-6-ethylsulfone | 1-$\beta$,$\gamma$-dihydroxypropyl-7-trifluoromethylbenzomorpholine | Do. |
| 1-amino-4-nitrobenzene-6-methylsulfonamide | ......do...... | Do. |
| 1-amino-2-chloro-4-nitrobenzene | ......do...... | Do. |
| 1-amino-2,4-dinitrobenzene | ......do...... | Violet. |
| 1-amino-2,4-dinitro-6-chlorobenzene | ......do...... | Do. |

| Amine | Coupling Component | Color |
| --- | --- | --- |
| 1-amino-2-nitro-4-fluorobenzene | 1-β,γ-dihydroxypropyl-2-trifluoromethylbenzomorpholine | Rubine. |
| 1-amino-2-hydroxy-4-nitrobenzene | 1-β,γ-dihydroxypropyl-2-trifluoromethyl-7-methoxybenzomorpholine | Do. |
| p-nitroaniline | 1-β,γ-dihydroxypropyl-2-trifluoromethyl-5-chlorobenzomorpholine | Red. |
| Do | 1-methyl-7-methyl-7-trifluoromethylbenzomorpholine | Do. |
| Do | 1-butyl-2-methyl-7-trifluoromethyl-1,2,3,4-tetrahydroquinoline | Do. |
| Do | 1-(γ-methoxy-β-hydroxy)-propyl-2-methyl-7-trifluoromethyl-1,2,3,4-tetrahydroquinoline | Do. |
| p-aminoazobenzene | 1-β,γ-dihydroxypropyl-2-methyl-7-trifluoromethyl-1,2,3,4-tetrahydroquinoline | Orange. |
| Do | 1-β,γ-dihydroxypropyl-7-trifluoromethylbenzomorpholine | Do. |
| 1-amino-2,4-dinitro-6-trifluoromethylbenzene | 1-β,γ-dihydroxypropyl-2-methyl-7-trifluoromethyl-1,2,3,4-tetrahydroquinoline | Violet. |
| Do | 1-β,γ-dihydroxypropyl-7-trifluoromethylbenzomorpholine | Do. |
| Do | 1-β-hydroxypropyl-2-trifluoromethyl-1,2,3,4-tetrahydroquinoline | Do. |
| 1-amino-2,4-dinitrobenzene-6-sulfonallylamide | 1-β,γ-dihydroxypropyl-2-methyl-7-trifluoromethylbenzomorpholine | Blue. |
| p-aminoacetophenone | 1-β,γ-dihydroxypropyl-2-methyl-7-trifluoromethyl-1,2,3,4-tetrahydroquinoline | Orange. |
| Do | 1-n-γ-hydroxypropyl-2-methyl-7-trifluoromethylbenzomorpholine | Do. |
| 1-amino-2-cyano-4-nitrobenzene | 1-α-β-hydroxypropyl-2-methyl-7-trifluoromethyl-1,2,3,4-tetrahydroquinoline | Rubine. |
| 1-amino-2,4-dinitro-6-cyanobenzene | 1-β,γ-dihydroxypropyl-2-trifluoromethyl-1,2,3,4-tetrahydroquinoline | Blue. |
| 1-amino-2-nitro-4-cyanobenzene | 1-β,γ-dihydroxypropyl-7-trifluoromethyl-1,2,3,4-tetrahydroquinoline | Rubine. |
| 1-amino-2-methylsulfone-4-nitrobenzene | 1-β-hydroxyethyl-2-trifluoromethyl-7-methoxy-1,2,3,4-tetrahydroquinoline | Do. |
| 1-amino-4-nitrobenzene-6-ethylsulfonamide | do | Do. |
| α-naphthylamine | 1-β,γ-dihydroxypropyl-2-methyl-7-trifluoromethyl-1,2,3,4-tetrahydroquinoline | Orange. |
| 1-amino-2,4-dinitronaphthalene | do | Violet. |
| 1-amino-8-naphthol-4-sulfonic acid | do | Red. |
| 1-amino-5-naphthol | do | Do. |
| 2-amino-5-nitrobenzene sulfonic acid | 1-β,γ-dihydroxypropyl-2-methyl-7-trifluoromethylbenzomorpholine | Do. |
| 1-amino-4-nitro-6-acetobenzene | do | Rubine. |
| 1-amino-4-nitrobenzene-6-methylsulfone | 1-β-sulfatoethyl-7-trifluoromethyl-1,2,3,4-tetrahydroquinoline | Do. |
| 1-amino-5-naphthol | 1-γ-phosphatopropyl-2-methyl-7-trifluoromethylbenzomorpholine | Do. |
| 1-amino-2,4-dinitronaphthalene | 1-β,γ-dihydroxypropyl-2-trifluoromethyl-1,2,3,4-tetrahydroquinoline | Do. |
| 4-amino-5-chlorobenzenesulfonic acid | 1-β,γ-dihydroxypropyl-2-trifluoromethylbenzomorpholine | Violet. |
|  | 1-β,γ-dihydroxypropyl-7-trifluoromethyl-1,2,3,4-tetrahydroquinoline | Red. |

It will be understood that the foregoing examples are intended to be illustrative and not limitative of our invention or discovery. The diazonium compounds of any of the amines indicated herein can be coupled, for example, with any of the coupling components indicated herein to yield dye compounds of the invention or discovery. Additional amines that can be diazotized and employed in the preparation of the dye compounds include, for example, o-chloroaniline, m-sulfanilic acid, p-sulfanilic acid, 4-amino-5-nitrobenzenesulfonic acid, 2-amino-5-bromobenzene-sulfonic acid, 3-amino-4-hydroxy-6-chlorobenzenesulfonic acid, 3-amino-4-hydroxy-5-chlorobenzenesulfonic acid, 3-amino-4-hydroxy-6-methylbenzenesulfonic acid, 1-amino-2,4-dinitro-6-hydroxy-benzene, 1-amino-2-naphthol-4-sulfonic acid, 2-amino-5-naphthol-4-sulfonic acid, 1-naphthylamine-6,8-disulfonic acid, 4-amino-4'-nitroazobenzene, 4-amino-4'-sulfoazobenzene and 4-amino-2'-chloro-4'-nitroazobenzene.

In order that the preparation of the azo compounds of our invention or discovery may be clearly understood the preparation of the coupling components used in their manufacture is given hereinafter. Not all the compounds whose preparation is given are necessarily new.

*Preparation of 2-methyl-7-trifluoromethylbenzomorpholine*

One gram mole of 3-nitro-4-hydroxytrifluoromethylbenzene is dissolved in 1 liter of ethanol and 1 gram mole of sodium ethylate is added. One gram mole of chloroacetone is then added slowly at room temperature and the reaction which takes place is completed by warming. The reaction mixture is filtered and the filtrate consisting of a solution of 3-nitro-4-acetonoxytrifluoromethylbenzene is purified by treatment with animal charcoal, filtered, and charged into a shaking autoclave together with 20 grams of Raney nickel. The reaction mixture is heated rapidly with shaking to 100° C. under a hydrogen pressure of 1800 pounds. When about 4 moles of hydrogen have been absorbed the reaction mixture is cooled, the nickel removed by filtration, and the desired product recovered by distillation under reduced pressure. The desired product boils at 91–94° C./1 mm.

*Preparation of 7-trifluoromethyl-1,2,3,4-tetrahydroquinoline*

A mixture composed of 45 grams of 95% glycerol, 48.3 grams of m-trifluoromethylaniline, 36.5 grams of m-nitrobenzenesulfonic acid, and 91.5 grams of concentrated sulfuric acid (sp. gr. 1.84) was heated under reflux until a vigorous reaction started. (A temperature of about 140–145° C.) After the reaction had subsided, the mixture was refluxed for about 6 hours. The reaction mixture was then made alkaline by adding a 20% sodium hydroxide solution after which it was extracted with benzene. The benzene extract was distilled under reduced pressure and the 7-trifluoromethylquinoline formed was collected at 115–120° C./22 mm. A 73% yield of the desired product was obtained.

The 7-trifluoromethylquinoline was treated with hydrogen in the presence of Raney nickel in a suitable pressure vessel in about 3 times its weight of ethyl alcohol. The reduction took place at 120–130° C. under a pressure of 1000 pounds. 7-trifluoromethyl-1,2,3,4-tetrahydroquinoline was obtained by distillation under reduced pressure and has a boiling point of 135–140° C./22 mm.

*Preparation of 2-trifluoromethylbenzomorpholine*

One gram mole of o-nitrophenol is reacted with chlorotrifluoroacetone in accordance with the procedure described in connection with the preparation of 2-methyl-7-trifluoromethylbenzomorpholine and the resulting o-nitro-ω-trifluorophenoxyacetone is reduced to 2-trifluoromethylbenzomorpholine. The reduction is carried out in accordance with the procedure described for 2-methyl-7-trifluoromethylbenzomorpholine. The desired compound boils at 84–88° C./1 mm.

*Preparation of 1-β, γ-dihydroxypropyl-2-trifluoromethyl-1,2,3,4-tetrahydroquinoline*

One gram mole of 2-tri(chloro or bromo)methylquinoline is reacted with 1.2 gram moles of antimony trifluoride in accordance with the procedure described by Swarts "Bulletin de l'Academie Royal Belgique" (3), vol. 35, pages 375–420. The resulting 2-trifluoromethylquainoline is purified by washing with an alkali (e. g., an aqueous sodium carbonate solution) following which it is recovered by distillation under reduced pressure.

One gram mole of the 2-trifluoromethylquinoline prepared above is charged into an autoclave together with 5 grams of Raney nickel and about three time its weight of ethyl alcohol and reduced at about 100° C. under hydrogen pressure of 1600 pounds. The resulting 2-trifluoromethyl-1,2,3,4-tetrahydroquinoline compound is converted to the desired compound by heating with 1.1 gram molecular equivalents of $$ClCH_2CHOHCH_2OH$$

at 140° C. in the presence of 1.1 gram molecular equivalents of sodium bicarbonate.

*Preparation of 2-methyl-7-trifluoromethyl-1,2,3,4-tetrahydroquinoline*

48.3 grams of m-trifluoromethylaniline, 36.5 grams of m-nitrobenzenesulfonic acid, 91.5 grams of concentrated sulfuric acid and 40 grams of water are placed in a flask equipped with a mechanical stirrer, reflux condenser and dropping funnel. The mixture is heated to about 130° C. and 25 grams of crotonaldehyde (unpolymerized) is gradually added while maintaining the reaction temperature at about 130° C. Normally external cooling is employed as this permits the crotonaldehyde to be added more rapidly. Care should be taken not to let the temperature fall below about 125° C. because if the temperature falls too low the reaction may not proceed as fast as the crotonaldehyde is added and a delayed reaction may take place with violence. After the crotonaldehyde has been added heating is continued at 130° C. for 5-6 hours. On cooling, phenylhydroxylamine-m-sulfonic acid separates and can be recovered by filtration if desired. The reaction product contains a trace of m-trifluoromethylaniline and about 2% of N-n-butyl-m-trifluoromethylaniline. The reaction product can be worked up as follows:

The reaction mixture is poured into 400 cc. of water and sodium nitrite is added until a positive test for nitrous acid is obtained. About 11 grams of sodium nitrite is required. Then the mixture is made alkaline with sodium hydroxide (about 85 grams). Following this the reaction mixture is steam-distilled using a continuous steam distillation process and 2-methyl-7-trifluoromethylquinoline crystallizes from the distillate on cooling. 2-methyl-7-trifluoromethylquinoline can be converted to 2-methyl-7-trifluoromethyl-1,2,3,4-tetrahydroquinoline by reduction with hydrogen in the presence of Raney nickel following the procedure indicated hereinbefore.

*Preparation of 2-trifluoromethyl-7-methoxybenzomorpholine*

40 grams of sodium-2-nitro-4-methoxyphenol, 500 cc. of acetone and 1 gram of sodium iodide are placed in a suitable reaction vessel and 32 grams of chlorotrifluoroacetone

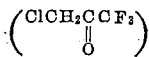

are slowly added with stirring. The reaction which takes place is completed by heating with refluxing for a few hours. The reaction mixture is poured into water, slurried with aqueous 5% sodium hydroxide, the 2-nitro-4-methoxyphenoxy-trifluoroacetone formed in the reaction is recovered by filtration, washed with water and dried.

The 2-nitro-4-methoxyphenoxytrifluoroacetone thus obtained is placed in a shaking autoclave together with 200 cc. of ethanol and 5 grams of Raney nickel and shaken with hydrogen at about 100° C. under a hydrogen pressure of 1500 lbs. When no more hydrogen is taken up, the bomb containing the reaction mixture is cooled, the Raney nickel removed by filtration and the filtrate distilled under reduced pressure, e. g., 5-10 mm. A good yield of 2-trifluoromethyl-7-methoxybenzomorpholine is obtained.

*Preparation of 2-trifluoromethyl-5-chlorobenzomorpholine*

This compound is obtained if one substitutes an equivalent gram molecular weight of 2-nitro-6-chlorophenol for 2-nitro-4-methoxyphenol in the example describing the preparation of 2-trifluoromethyl - 7 - methoxybenzomorpholine and proceeds as set forth in the example.

*Preparation of 2-trifluoromethyl-7-methoxyquinoline*

In a flask equipped with a mechanical stirrer, thermometer, reflux condenser and dropping funnel are placed 121 grams of m-anisidine, 150 grams of m-nitrobenzene sulfonic acid, 350 cc. of aqueous sulfuric acid (98% by weight) and 125 cc. of water. The reaction mixture is heated to 130° C. and 150 grams of trifluorocrotonaldehyde ($CF_3CH=CHCHO$) are added dropwise with stirring at such a rate that the temperature does not rise above 130° C. Usually 3 to 4 hours are required for the addition. The reaction mixture is maintained at 130° C., with stirring, for 5 to 6 hours more following which it is poured into water, made neutral by the addition of aqueous sodium hydroxide and then steam distilled to recover the 2-trifluoromethyl-7-methoxyquinoline formed in the reaction, which is purified by distillation under reduced pressure, e. g., 5-10 mm. 2-trifluoromethyl-7 - methoxytetrahydroquinoline is obtained by hydrogenating the 2-trifluoromethyl-7-methoxyquinoline with hydrogen at 100° C. in a shaking autoclave in the presence of Raney nickel and under a hydrogen pressure of 1500 pounds.

*Preparation of 7-trifluoromethylbenzomorpholine*

40 grams of sodium 2-nitro-4-trifluoromethylphenol, 500 cc. of acetone and 1 gram of sodium iodide are placed in a suitable reaction vessel and 50 grams of bromoacetal

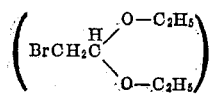

are slowly added stirring. The resulting 4-trifluoromethyl-2-nitrophenoxy-acetal is suspended in water and warmed with 10% aqueous hydrochloric acid following which it is hydrogenated with hydrogen in the presence of Raney nickel at 100° C. under a hydrogen pressure of 1500 lbs. A good yield of 7-trifluoromethylbenzomorpholine is obtained.

In some instances the preparation of the free amino form of the coupling component has been described. However, the manner of introducing groups such as β-hydroxyethyl- and β,γ-dihydroxy-propyl-, for example, into the amino group is well known to those skilled in the art and need not be described here.

The azo compounds of our invention or discovery are, for the most part, relatively insoluble in water and, accordingly, they may be advantageously directly applied to the material undergoing coloration in the form of an aqueous suspension which can be prepared by grinding the dye to a paste in the presence of a sulfonated oil, soap, or other suitable dispersing agent and dispersing the resulting paste in water. Where the dye possesses a sulfonic acid group or other water-solubilizing group it may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents together with the amounts that may be employed are disclosed in McNally and Dickey Patent No. 2,115,030, issued April 26, 1938. The process disclosed in this patent for the dyeing of cellulose acetate silk can be used in applying the dyes of the present application to this material.

It will be understood that textile materials prepared from organic derivatives of cellulose, wool, silk, and nylon, or mixtures of these materials, can be directly colored from an aqueous dyebath in accordance with the procedure indicated herein. However, other suitable methods for the dyeing of these materials are known to those skilled in the art and these methods of course can be used in applying the dye compounds of this invention if desired. Where lacquers composed of cellulose esters and cellulose ethers, for example, are to be colored, the dye compounds of our invention or discovery may be applied to these materials by the methods employed in the art for their coloration.

It is here noted that the term nylon refers to a nuclear polyamide resin which is believed to be basically described or claimed in U. S. Letters Patent No. 2,071,250, issued February 16, 1937, to Wallace H. Carothers.

This application is a continuation-in-part of our copending application, Ser. No. 472,984, filed January 20, 1943, now Patent No. 2,432,393.

We claim:

1. The azo compounds having the general formula:

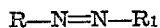

wherein R—N=N— stands for the residue of a diazotized member selected from the group consisting of a monocyclic arylamino compound of the benzene series, an arylamino compound of the naphthalene series containing no cyclic nucleus other than a single naphthalene nucleus and an aminoazobenzene and R₁ stands for a coupling component selected from the group consisting of a trifluoromethylbenzomorpholine compound and trifluoromethyl-1,2,3,4-tetrahydroquinoline compound and wherein said coupling components are joined to the azo bond through the carbon atom in the 6-position.

2. The nuclear non-sulfonated azo compounds having the general formula:

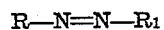

wherein R—N=N— stands for the residue of a diazotized monocyclic arylamino compound of the benzene series and R₁ stands for a trifluoromethyl-1,2,3,4-tetrahydroquinoline coupling component joined to the azo bond through the carbon atom in its 6-position.

3. The nuclear non-sulfonated azo compounds having the general formula:

wherein R—N=N— stands for the residue of a diazotized monocyclic arylamino compound of the benzene series and R₁ stands for a trifluoromethylbenzomorpholine coupling component joined to the azo bond through the carbon atom in its 6-position.

4. The nuclear non-sulfonated azo compounds having the general formula:

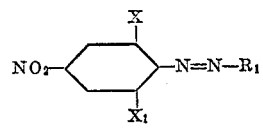

wherein X stands for a member selected from the group consisting of hydrogen, a nitro group and a halogen atom, X₁ stands for a member selected from the group consisting of hydrogen, a halogen atom, an alkylketo group, an alkyl group, an alkoxy group, a cyano group, a hydroxy group, an alkylsulfone group and a sulfonamide group and R₁ stands for a 1-hydroxyalkyl trifluoromethyl-1,2,3,4-tetrahydroquinoline coupling component joined to the azo bond through the carbon atom in its 6-position.

5. The azo compounds having the formula:

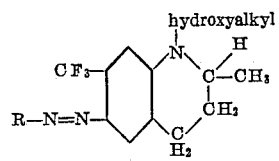

wherein R—N=N— stands for the residue of a diazotized monocyclic arylamino compound of the benzene series.

6. The azo compounds having the formula:

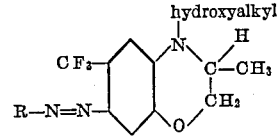

wherein R—N=N— stands for the residue of a diazotized monocyclic arylamino compound of the benzene series.

7. The azo compounds having the formula:

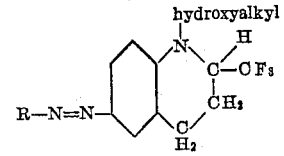

wherein R—N=N— stands for the residue of a diazotized monocyclic arylamino compound of the benzene series.

8. The azo compound having the formula:
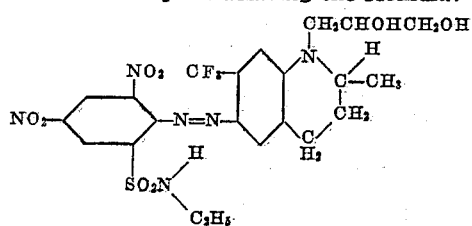
9. The azo compound having the formula:
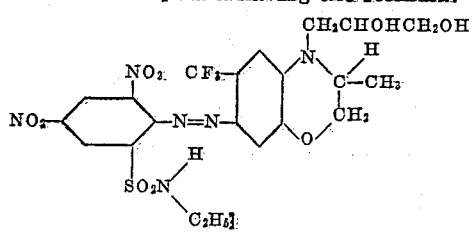
10. The azo compound having the formula:
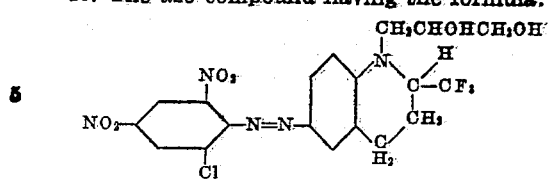
JOSEPH B. DICKEY.
JAMES G. McNALLY.
REFERENCES CITED
The following references are of record in the file of this patent:
UNITED STATES PATENTS
| Number | Name | Date |
|---|---|---|
| 2,173,054 | Hitch | Sept. 12, 1939 |
| 2,194,927 | Daudt | Mar. 26, 1940 |
| 2,251,947 | McNally | Aug. 12, 1941 |
| 2,342,678 | McNally | Feb. 29, 1944 |
| 2,391,886 | Dickey | Jan. 1, 1946 |